United States Patent [19]

Zaninelli

[11] 4,038,891

[45] Aug. 2, 1977

[54] DEVICE FOR THE AUTOMATIC POSITIONING OF A TOOL

[75] Inventor: Ettore Zaninelli, Milan, Italy

[73] Assignee: Baruffaldi Frizioni S.p.A., Milan, Italy

[21] Appl. No.: 682,646

[22] Filed: May 3, 1976

[30] Foreign Application Priority Data

May 6, 1975 Italy .................................. 23055/75

[51] Int. Cl.² .............................................. B23B 29/28
[52] U.S. Cl. ..................................... 82/36 A; 74/826
[58] Field of Search .............. 82/36 A; 74/813 L, 826

[56] References Cited

U.S. PATENT DOCUMENTS

| 3,222,955 | 12/1965 | Ross et al. | 82/36 A |
| 3,760,655 | 9/1973 | Buchmeier | 74/826 |

Primary Examiner—Leonidas Vlachos
Attorney, Agent, or Firm—Kurt Kelman

[57] ABSTRACT

The invention provides automatic positioning of a tool carrier in a turret for machine tools. The turret comprises a support mounted on a base for rotation and against axial displacement and a tool carrier mounted on the support for rotation therewith. The tool carrier has a guide in alignment with an annular track on the base. A pair of coaxial rings of teeth on the base and the tool carrier are arranged for meshing engagement to locate the tool carrier on the base in a working position, and a bolt is glidably mounted in the guide and is displaceable along the track upon rotation of the tool carrier. The track has a plurality of recesseseach adapted to receive a projecting end of the bolt for locking the tool carrier in position. The projecting bolt end and the recesses have corresponding inclined camming surfaces for moving the bolt end out of the recesses upon rotation of the tool carrier, and the support has a like plurality of recesses each adapted to receive the opposite projecting end of the bolt when the first-mentioned projecting end is axially displaced out of the first-mentioned recesses upon rotation of the tool carrier.

3 Claims, 7 Drawing Figures

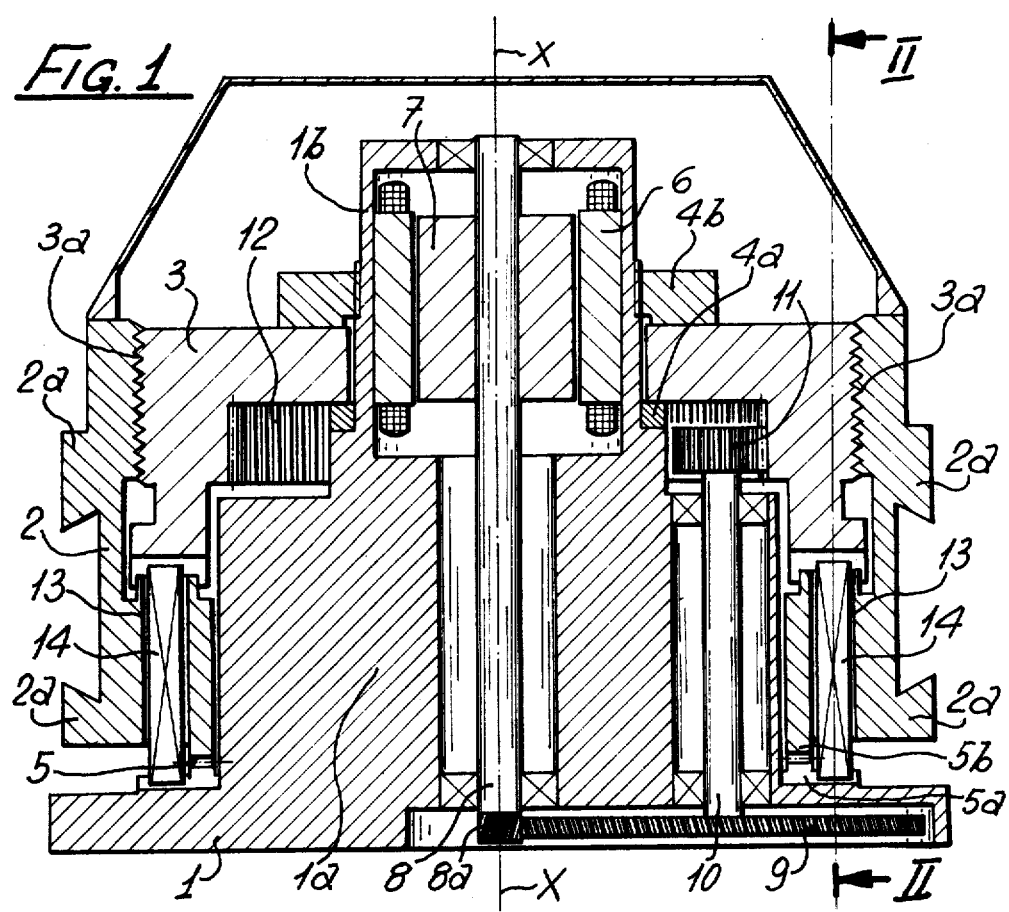

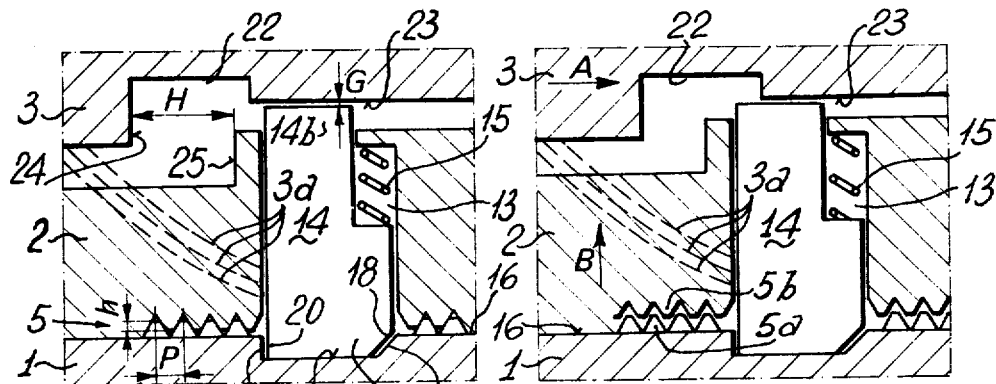
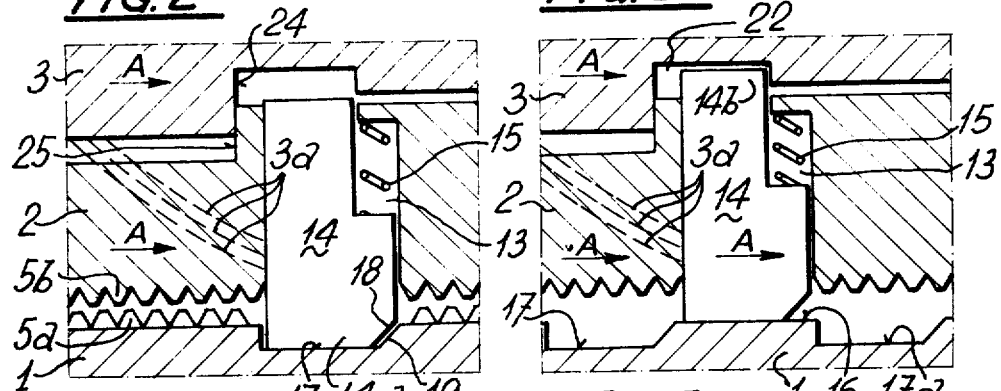
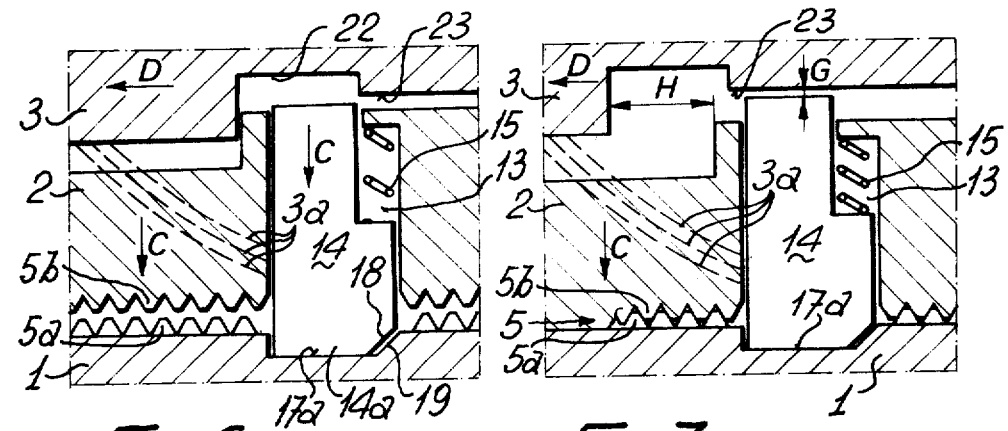

DEVICE FOR THE AUTOMATIC POSITIONING OF A TOOL

The present invention concerns a device for the automatic positioning of a tool carrying body in revolving turrets for machine tools or the like, particularly for lathes, with a parallelopiped type tool carrier, or disc or flat type tool carriers or the like. Tool carrier turrets of the so-called revolving type, carry a variety of tools, each for executing a specific type of work in successive strokes.

The movements effected automatically by such turrets are generally as follows:

a. Rotation of a part of the turret to cause an axial movement to release tha tool carrier body from the fixed base of the turret, b. Rotation of the tool carrier body from one position to the next, c. Positioning the tool carrier body in the new position, d. Reversal of the rotation of the part of the turret to lock the tool carrier body, relative to the base, in the new position.

As is well known, such movements are provided by an electric motor (controlled by suitable selectors with rotating brush contacts or the like) which rotates a clamp member, coaxial with the turret, the member being rotatable by the electric motor, but being axially non-displaceable. The tool carrying body or disc is provided with a nut coupled to the clamp member with a series of teeth on the front which are uniformly distributed on a toothed crown and mesh with a similar set of teeth on an opposing toothed crown connected to the fixed base of the turret. The rotation of the clamp member causes the axial movement of the nut connected to the tool carrying body which is initially unable to rotate as a result of the contact between the teeth of the two opposed crowns.

The tool carrying body can rotate, after release from the base has taken place by the disengagement of the teeth, in order to assume a new angular position so as to bring the following tool into a working position. For this purpose means and devices are provided which, after the release of the crowns, connect the clamp member with the nut in such manner that the latter, together with the tool carrying body, is rotated through a certain angle into the new position.

These known devices substantially comprise a ring having a cam outline, a ratchet, a return spring, engaging levers and the like, which actuate a fork with projecting prongs provided with return springs in such manner that a tooth engages in a series of recesses formed in a ring connected to the tool carrying body. These known devices, apart from having a complex construction, due to the number, shape and arrangement of the components, have several serious disadvantages which limit the speed of rotation, require very heavy duty construction and sometimes bring the tool carrying body into incorrect positions.

In fact, these known devices require, for the exact positioning of the locking means in the associated recesses, the tool carrying body to exceed the locking point by a certain predetermined angle and therefore execute a return movement until reaching the predetermined position on the opposed surfaces. Such return movement has to be preceded by the disengagement of the clamp member from the nut, whereby the nut is urged to rotate and continues this movement by inertia, whilst the axial closing movement has already begun. The result of this is that the tool carrying body has to acquire an appreciable speed in the return movement, with the possibility of jolts at the time of stopping and with the consequent possibilities of rebounding, incorrect locking of the opposing crowns or, frequently, with undesirable locking of the teeth.

The device according to the present invention seeks to avoid these disadvantages and, moreover, makes it possible to increase speeds of rotation with improvements in results and with a longer life of the turret.

According to the invention there is provided a device for automatic positioning of a tool carrying body in turrets for machine tools, such as latches or the like, comprising a base, a tool carrying body, a rotatable support member which is axially non-displaceable on the base, and a pair of toothed crowns for locating the tool carrier in a working position on the base, at least one bolt being provided in a guide of the tool carrier, the bolt projecting beyond the bottom and top of the guide and being displaceable on a circular track of the base, coaxial with the turret, the track having a plurality of recessess for each locked position of the tool carrier, the lower portion of the bolt extending into one of the recesses, said lower portion of the bolt and the recesses having corresponding inclined surfaces, there being formed in the rotatable support member a recess for receiving each bolt when the support member is driving the tool carrier. Preferably, an abutment surface is provided on the rotatable clamp member adjacent to the upper recess, the abutment surface being disposed almost in contact with the upper part of the bolt when it is completely inserted in the lower recess in the fixed base.

Resilient means may be provided, such as a helical compression spring or the like, disposed between the bolt and the tool carrying body so as to constantly urge the bolt towards the lower recesses.

By means of the device, the positioning of the tool carrying body in a working position and the movement to subsequent positions take place in the following sequence:

i. Rotation of the clamp member for raising the tool carrying body until it is disengaged from the teeth of the opposing crowns;

ii. Rotation, by means of the clamp member, of the tool carrying body with simultaneous superposition of the recess of the clamp member, above the upper part of the bolt;

iii. Withdrawal of the lower portion of the bolt from the lower recess under the action of rotation and due to abutment between corresponding inclined surfaces on the bolt and the recess whilst the upper part of the bolt enters the upper recess;

iv. Rotation of the tool carrying body and associated bolt, which slides on the track of the base as far as the new locking position; v. Entrance of the lower part of the bolt in the recess of the base under the effect of the resilient means when the new working position is reached and simultaneous reversing of the movement of rotation of the clamping member and commencement of the locking phase; vi. Completion of the locking phase with the engagement of the teeth on the opposing crowns for the exact positioning of the tool carrying body.

The abutment surface on the rotatable member adjacent to the recess for the upper part of the bolt has the function of preventing the bolt from jumping out of the lower recess when the screw is in a position different from that when rotating with the tool carrying body. This makes it possible to avoid accidental disengagements due to vibrations, jolts or the like. It also avoids the tool carrying body continuing its movement due to inertia when the frictional engagement with the rotatable member has ceased and when the rotatable member has already reversed the movement of rotation upon reaching the next positioning recess. Indeed, in the case of any displacement beyond the locking position, the bolt would tend to be thrust out of the lower recess as a result of the opposing inclined surfaces, whereby it would abut against the abutment surface. This prevents any further movement of the tool carrying body which is greater than that permitted by the play between the bolt and abutment surface.

In order to avoid small movements, due to inertia or the like, it is also proposed that the lower recess of the fixed base should be slightly greater than the dimensions of the lower part of the bolt without exceeding the pitch between the teeth of the opposed locking crowns, in order to permit, in each case, by means of the meshing of the teeth with each other, exact positioning of the tool carrying body.

The bolt may be disposed in a radial direction in the case of so-called turret discs.

In this case the track on the lower part of the bolt with the associated positioning recesses, is disposed on an inner cylinder, whilst the recess of the rotatable member and the associated abutment surface for preventing the emergence of the bolt, are disposed on a cylindrical surface coaxial with the internal cylinder.

The present invention will be described further, by way of example with reference to the accompanying drawing, in which:

FIG. 1 shows, in a simplified schematic form, a section through a prismatic turret;

FIG. 2 shows a side view of a positioning device for the turret, in section, on the line II—II of FIG. 1, in a position in which the tool carrying body is locked; and FIGS. 3, 4, 5, 6 and 7 are views similar to that of FIG. 2 showing the positioning device in successive positions of the tool carrying body during a positioning process.

FIG. 1 shows, greatly simplified and schematically, an automatic revolving tool carrying turret for a lathe of the like machine, having a prismatic tool carrying body. The turret comprises base 1 which has to be secured to the machine, which base 1 has a central cylindrical extension 1a. A tool carrying body 2 provided with guides 2a for receiving the tools is supported on a ring member 3 coaxial with the axis x of the tool carrying body 2 Ring member 3 is free to rotate about the axis x, but is not axially displaceable. A support ring 4a and a stop ring 4b screwed on the sleeve extension 1b of the base 1 support and locate the member 3. The tool carrying body 2 is mounted on member 3 for rotation therewith and for axial displacement relative to base 1 and can be located on the base 1 by means of interengaging rings 5a and 5b of teeth respectively provided on the base 1 and the rotatable body 2. The member 3 and the tool carrying body 2 are interconnected by a thread 3a which, when the member 3 is rotated, causes the body 2 to move axially upwardly or downwardly according to the direction of rotation of the member 3.

Disposed coaxially with the axis x of the tool carrying body 2 is an electric motor 6, the rotor 7 of which has a shaft 8 terminating in a pinion 8a which engages with a toothed wheel 9 connected to a shaft 10 having a pinion 11 which engages with inner teeth 12 provided on the member 3.

This drive mechanism makes it possible to gear the number of turns of the rotor 7 down to the value required for the angular displacement of the member 3. As will be explained hereinafter, bolts 14 are supported in guides 13 in the rotatable body 2 for sliding movement within guides 13, parallel to the axis x.

With reference to FIG. 2, parts 1, 2, 3, 3a, 5, 13 and 14 are shown schematically in order to explain the operation of the positioning device according to the present invention, it being understood that a plurality of identical devices may be provided for the same turret FIG. 2shows that the bolt 14 may slide in the guide 13 and is biassed downwardly by a spring 15, upper and lower ends 14a and 14b of the bolt 14 project beyond the tool carrier 2 and meshing teeth 5 have a pitch P.

Formed on the base 1 is annular track 16 on which the lower end 14a of the bolt 14 can slide. Formed on track 16 is a series of recesses 17 for each alternative position of the tool carrier 2, which recesses 17 lower end 14a of the bolt 14 can enter. Bolt in 14a and the recess 17 respectively have a camming surface 18 and 19 inclined in the direction of movement indicated by the arrow A, and abutment surfaces 20 and 21 parallel to the axis x, on the opposite side.

The ring member 3 has a recess 22 opposite the recess 17, which the upper end 14b of the bolt 14 can enter when it is lifted from recess 17. Abutment surface 23 is provided on support member 3 adjacent recess 22 and is disposed parallel to the upper surface of end 14b of the bolt 14, so that there is a small amount of play G when the bolt 14 is in the lower recess 17.

The upper recess 22 also has an abutment surface 24 which may bear on an abutment surface 25 of the tool carrier 2, the normal spacing H between the said surfaces corresponding to an angular movement of the member 3 such that its thread 3a axially raises the tool carrier 2 by an amount h such as to disengage the teeth 5b from the teeth 5a before abutment surfaces 24 and 25 engage.

In FIG. 2, the parts are shown in the locked position i.e. the bolt 14 is inserted in the recess 17, the teeth 5a and 5b mesh with each other, the member 3 is set and the tool carrier 2 is in one of its working positions.

So that the tool carrier 2 may move to the next working position, the above-described parts execute the following movements.

In FIG. 3, when the rotor 7 of the electric motor 6 is started, it rotates, by way of the reduction gear 8a, 9, 11, 12, the member 3 in the direction of the arrow A whereby the thread 3a raises the tool carrier 2 in the direction of the arrow B, disengaging the teeth 5b from the teeth 5a. These movements are shown in FIG. 3, whilst in FIG. 4 the movements are completed, i.e. the member 3 has travelled a length H so that its surface 24 bears against the surface 25 and the teeth 5b are completely disengaged from the teeth 5a. The bolt 14 is still inserted in the recess 17 by effect of the spring 15. At this point, the tool carrier 2 is free to rotate in the direction of the arrow A under the thrust of the surface 24, since it is no longer being retained by the teeth 5a and is therefore rotated by the member 3. The inclined surface 18 of the bolt 14 facing the inclined surface 19 of the recess 17 now raises the bolt 14 until its lower end 14a is level with and rides onto the track 16. The upper end 14b of the bolt 14 enters the recess 22 of member 3, as shown in FIG. 5. With the continuing rotation of the electric motor 6, the bolt 14 is in frictional engagement with the track 16, until it reaches the next locating recess 17a.

FIG. 6 shows the position at the moment the bolt 14 reaches the new positioning recess 17a. The lower end 14a of the bolt 14 enters the recess 17a urged by the spring 15 in the direction of the arrow C. Simultaneously with the entrance of the bolt 14 in the positioning recess 17a, the direction of rotation of the rotor 7 is reversed, whereby the member 3 rotates in the direction shown by the arrow D, beginning the screwing phase, thus urging the tool carrier 2 downwardly in the direction of the arrow C by its thread 3a.

FIG. 7 shows the completion of the rotation in the direction of the arrow D, of the member 3, causing tool carrier 2 to be axially displaced in the direction of the arrow C until the teeth 5b completely engage teeth 5a, exactly determining the new position of the tool carrier 2 corresponding to the positioning recess 17a.

As may be seen from FIGS. 6 and 7, as soon as the reversing movement of the member 3 begins in the direction of the arrow D, the abutment surface 23 moves above the upper end 14b of the bolt 14. The result is that, even if the tool carrier 2 tends to continue its movement in the direction of the arrow A, after the bolt 14 has entered the new positioning recess 17a, thus tending to raise the bolt 14 by the inclined plane 18 abutting on the plane 19, such movement would be limited to the play G allowed by the abutment surface 23.

To permit such small movements of the tool carrier 2 and associated bolt 14, due to inertia or other causes, it is proposed that the dimensions of each recess 17 should be slightly greater than those of the lower end 14a of the bolt 14. This longer dimensioning is nevertheless smaller than the pitch P of the teeth 5.

Thus, when the bolt 14 has entered the recess 17, the exact positioning of the tool carrier 2 may be effected by the inclined flanks of the teeth 5b opposed by the teeth 5a.

The positioning device may be similarly applied to disc or like turrets in which the base, having the same function as the base 1 of the above described turret, is formed by an inner cylinder on which other cylinders are coaxially disposed, constituting the tool carrier 2 and the ring member 3 with functions identical to the already described parts 2 and 3.

The device has a similar arrangement of already described parts, the only variations being that they are on the cylindrical surfaces, instead of on plane ones.

It will be understood that numerous variations of a constructional type may be applied to the above described device, more particularly with regard to the known parts of the turret, without departing from the scope of the present invention.

I claim:

1. A turret for machine tools, comprising
   1. a base having an axis and defining an annular track coaxial therewith,
   2. a support member mounted on the base for rotation about the axis and against axial displacement,
   3. means for rotating the rupport member about the axis,
   4. a tool carrier defining a guide parallel to the axis and in alignment with the track,
   5. means mounting the tool carrier on the support member for axial displacement during an initial angular movement of the support member upon rotation thereof and subsequent rotation therewith upon further angular movement of the rotating support member,
   6. a pair of coaxial rings of teeth respectively mounted on the base and on the tool carrier, the teeth of the two rings being in meshing engagement to locate the tool carrier on the base in a working position and the teeth being disengaged upon the axial displacement of the tool carrier for enabling the tool carrier to be rotated upon the further angular movement of the support member,
   7. a bolt slidably mounted in the guide and having ends projecting therebeyond, the bolt being displaced along the track with the tool carrier upon the subsequent rotation thereof,
   8. the annular track having a succession of tool carrier positioning recesses each adapted to receive a projecting end of the bolt for locking the tool carrier in position on the base, (a) the projecting bolt end and the recesses having corresponding inclined camming surfaces for moving the bolt out of the recesses upon the subsequent rotation,
   9. resilient means biasing the bolt end into a respective one of the tool carrier positioning recesses,
   10. the support member having a recess adapted to receive the opposite projecting bolt end when the first-mentioned bolt end is moved out of a preceding one of the tool carrier positioning recesses upon the subsequent rotation and, p1 11. cooperating abutment surfaces parallel to the axis on the support member and the tool carrier, the abutment surfaces being spaced apart in the working position of the tool carrier, the initial angular movement of the support member moving the abutment surfaces into engagement and the abutment surface on the support member entraining the tool carrier upon said engagement during the subsequent rotation.

2. The turret of claim 1, wherein the support member has an abutment surface cooperating with the opposite bolt end for preventing the bolt from moving out of the tool carrier positioning recess during the initial angular movement of the rotating support member whereby the bolt retains the tool carrier in the working position while the teeth disengage.

3. The turret of claim 1, wherein the rotating means is adapted for reversing the direction of rotation when the bolt end is received in a succeeding one of the tool carrier positioning recesses in the annular track for reengaging the teeth.